(12) United States Patent
Moran et al.

(10) Patent No.: US 7,867,605 B2
(45) Date of Patent: *Jan. 11, 2011

(54) INTRUSION RESISTANT GLASS LAMINATES

(75) Inventors: James R Moran, Longmeadow, MA (US); Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/991,565

(22) Filed: Nov. 18, 2004

(65) Prior Publication Data

US 2005/0106372 A1    May 19, 2005

Related U.S. Application Data

(63) Continuation of application No. 09/962,750, filed on Sep. 25, 2001, now abandoned.

(60) Provisional application No. 60/236,082, filed on Sep. 28, 2000.

(51) Int. Cl.
   B32B 17/06    (2006.01)
   B32B 17/10    (2006.01)
   B32B 27/08    (2006.01)
   B32B 27/30    (2006.01)
   B32B 27/36    (2006.01)

(52) U.S. Cl. ............... 428/215; 428/212; 428/213; 428/332; 428/337; 428/339; 428/426; 428/430; 428/437; 428/480; 428/483; 428/910

(58) Field of Classification Search ............... None
See application file for complete search history.

(56) References Cited

U.S. PATENT DOCUMENTS

| | | | | |
|---|---|---|---|---|
| 2,837,454 A | * | 6/1958 | Watkins et al. | 428/437 |
| 2,943,386 A | * | 7/1960 | Katz | 29/402.07 |
| 3,170,833 A | * | 2/1965 | Noyes | 428/416 |
| 3,322,613 A | * | 5/1967 | Rasmussen | 428/484.1 |
| 3,342,657 A | * | 9/1967 | Dyer | 156/163 |
| 3,409,495 A | * | 11/1968 | Rasmussen | 428/105 |
| 3,496,059 A | * | 2/1970 | Rasmussen | 428/198 |
| 3,841,890 A | | 10/1974 | Coaker et al. | |
| 3,956,559 A | * | 5/1976 | Wildorf | 428/214 |
| 3,965,057 A | | 6/1976 | Ammons | |
| 4,017,661 A | | 4/1977 | Gillery | |
| 4,028,475 A | * | 6/1977 | Willdorf | 428/215 |
| 4,073,986 A | | 2/1978 | Kelsar | |
| 4,144,217 A | | 3/1979 | Snelgrove et al. | |
| 4,278,736 A | | 7/1981 | Kamerling | |
| 4,429,005 A | * | 1/1984 | Penn | 428/350 |
| 4,465,736 A | | 8/1984 | Nishihara et al. | |
| 4,474,634 A | * | 10/1984 | Hiraoka et al. | 156/244.13 |
| 4,604,253 A | | 8/1986 | Gomez | |
| 4,614,676 A | | 9/1986 | Rehfeld | |
| 4,732,814 A | | 3/1988 | Hatada et al. | |
| 4,814,529 A | | 3/1989 | Cartier et al. | |
| 4,824,722 A | * | 4/1989 | Jarrett | 428/430 |
| 4,865,711 A | | 9/1989 | Kittler | |
| 4,865,918 A | | 9/1989 | Tanuma | |
| 4,911,984 A | * | 3/1990 | Parker | 428/428 |
| 4,945,002 A | * | 7/1990 | Tanuma et al. | 428/425.6 |
| 4,973,511 A | | 11/1990 | Farmer et al. | |
| 5,013,779 A | | 5/1991 | Fariss et al. | |
| 5,024,895 A | * | 6/1991 | Kavanagh et al. | 428/437 |
| 5,091,258 A | * | 2/1992 | Moran | 428/437 |
| 5,111,329 A | | 5/1992 | Gajewski | |
| 5,137,954 A | | 8/1992 | DasGupta et al. | |
| 5,145,744 A | | 9/1992 | Cartier et al. | |
| 5,189,551 A | | 2/1993 | Woodard | |
| 5,246,764 A | | 9/1993 | LaPorte et al. | |
| 5,264,058 A | | 11/1993 | Hoagland et al. | |
| 5,368,917 A | | 11/1994 | Rehfeld | |
| 5,427,842 A | * | 6/1995 | Bland et al. | 428/213 |
| 5,478,615 A | | 12/1995 | Rehfeld | |
| 5,482,767 A | | 1/1996 | Karagiannis et al. | |
| 5,529,654 A | | 6/1996 | Kavanagh et al. | |
| 5,529,848 A | | 6/1996 | D'Errico | |
| 5,536,347 A | | 7/1996 | Moran | |
| 5,618,863 A | | 4/1997 | D'Errico et al. | |
| 5,622,580 A | | 4/1997 | Mannheim | |
| 5,763,089 A | | 6/1998 | Chaussade | |

(Continued)

FOREIGN PATENT DOCUMENTS

AU    200122613 B2    6/2001

(Continued)

OTHER PUBLICATIONS

Notification of Transmittal of the International Search Report or the Declaration, International Application No. PCT/US01/29903, Date of mailing Feb. 6, 2002.

(Continued)

Primary Examiner—Vivian Chen
(74) Attorney, Agent, or Firm—Lewis, Rice & Fingersh, L.C.

(57) ABSTRACT

Composite laminate interlayers for adhering a glass laminate comprising two sheets of polyethylene terephthalate (PET) between layers of plasticized polyvinyl butyral (PVB) adhesive layers, wherein the two PET layers provide increased stiffness for the laminate without sacrificing the optical clarity of the laminate.

19 Claims, No Drawings

U.S. PATENT DOCUMENTS

| | | | |
|---|---|---|---|
| 5,773,102 A | 6/1998 | Rehfeld | |
| 5,796,055 A * | 8/1998 | Benson et al. | 181/208 |
| 5,846,363 A * | 12/1998 | Haverkamp | 156/106 |
| 5,932,329 A | 8/1999 | Frost | |
| 5,979,932 A | 11/1999 | Jourdaine | |
| 6,074,732 A * | 6/2000 | Garnier et al. | 428/215 |
| 6,119,807 A * | 9/2000 | Benson et al. | 181/208 |
| 6,532,119 B1 * | 3/2003 | Martinez, Sr. | 359/884 |
| 6,713,185 B2 * | 3/2004 | Carlson et al. | 428/426 |
| 6,824,868 B2 * | 11/2004 | Bell et al. | 428/343 |
| 6,911,254 B2 * | 6/2005 | Fisher et al. | 428/328 |
| 6,921,509 B2 * | 7/2005 | Moran et al. | 264/173.16 |
| 2001/0046595 A1 * | 11/2001 | Moran et al. | 428/212 |
| 2002/0061395 A1 | 5/2002 | Moran et al. | |
| 2003/0054160 A1 * | 3/2003 | Fisher et al. | 428/328 |
| 2003/0118840 A1 * | 6/2003 | Moran et al. | 428/425.6 |
| 2003/0161997 A1 * | 8/2003 | Moran | 428/172 |
| 2003/0203167 A1 * | 10/2003 | Bell et al. | 428/195.1 |
| 2003/0203214 A1 * | 10/2003 | Bell et al. | 428/426 |
| 2005/0106398 A1 * | 5/2005 | Moran et al. | 428/437 |
| 2005/0170160 A1 * | 8/2005 | Moran et al. | 428/214 |

FOREIGN PATENT DOCUMENTS

| | | |
|---|---|---|
| BR | 9106779 A | 7/1993 |
| CA | 2084662 A1 | 12/1991 |
| DE | 69101221 T2 | 2/1994 |
| DE | 19526912 | 5/1997 |
| DE | 19639350 | 1/1998 |
| DE | 19705586 C1 | 4/1998 |
| EP | 0157030 | 7/1989 |
| EP | 0535128 B1 | 2/1994 |
| EP | 0 710 545 A1 | 5/1996 |
| FR | 2697829 A1 | 5/1994 |
| JP | 59-143632 * | 8/1984 |
| JP | 09-076392 * | 3/1997 |
| JP | 09076392 | 3/1997 |
| JP | 10177390 A | 6/1998 |
| SU | 728697 | 4/1980 |
| WO | WO 92/03285 | 3/1992 |
| WO | WO 00/46027 | 8/2000 |
| WO | WO 01/07769 A1 | 3/2001 |
| WO | WO 01/43963 A1 | 6/2001 |
| WO | WO 02/26492 A1 | 4/2002 |

OTHER PUBLICATIONS

Written Opinion, International Application No. PCT/US01/29903, Date of mailing Sep. 25, 2002.
Notification of Transmittal of International Preliminary Examination Report, International Application No. PCT/US01/29903, Date of mailing Nov. 20, 2002.

* cited by examiner

INTRUSION RESISTANT GLASS LAMINATES

This application is a continuation of U.S. patent application Ser. No. 09/962,750, filed Sep. 25, 2001, abandoned, which claims the benefit of U.S. Provisional Application No. 60/236,082, filed Sep. 28, 2000.

BACKGROUND

It is known to use an energy absorbing interlayer of plasticized polyvinyl butyral (PVB) with one or more rigid layers such as glass in a safety glazing. Such a glazing is usually prepared by interposing the PVB layer between glass sheets while eliminating air from between the engaging surfaces and then subjecting the assembly to elevated temperature and pressure in an autoclave to fusion bond the PVB and glass and form an optically clear structure. These glazings are used in windows such as the front, side and rear windows in motor vehicles, particularly windshields, where the interlayer can absorb a blow from the head of an occupant without penetration of the windshield.

Automobile and homeowners, especially those who have experienced a vehicle break-in, theft or hurricane damage, are increasingly interested in intrusion resistant glazings. Glass has been identified as the weak link in the overall intrusion resistance of vehicles and buildings. For instance, some police reports estimate that broken glass is the entry route for at least 60% of unauthorized entry into passenger vehicles. There is also a belief that a 30-second delay in entry is sufficient to discourage many spontaneous thieves because the increased break-in time and additional noise call attention to the thief. In response, carmakers, at least, are replacing traditional tempered glass with laminated glass for enhanced security. Common automotive laminated glass, though, can be defeated by determined thieves who use more sophisticated tools to puncture by impact and pull laminated glass out from its frame.

Many attempts to improve the performance of glass laminates have been made, including modifying the stiffness and/or impact resistance of the PVB interlayer. For example, U.S. Pat. No. 4,814,529, to Cartier et al., discloses lightly crosslinking PVB resin to selectively increase molecular weight of the PVB and the modulus of a plasticized sheet formed therefrom for use in laminated safety glass assemblies. U.S. Pat. No. 5,246,764, to LaPorte et al., discloses laminated glazing with improved impact strength where mean break height for a dropped mass of a glass laminate increased by dispersing adhesion resistant means on the surface of PVB sheet. U.S. Pat. No. 5,482,767, to Karagiannis et al., discloses glass laminates of improved impact resistance comprising a PVB interlayer having discrete particles of crosslinked polyvinyl butyral integrally randomly dispersed throughout a matrix of PVB.

In recent years additional sophisticated features are appearing in such windows to enhance performance. These include special, layered metal/dielectric stacks for solar radiation control which may also be electrically conductive for defrosting, defogging, etc; holographic layers as solar reflecting mirrors and in head-up displays to facilitate viewing instruments on the vehicle dashboard while looking straight ahead; photochromic and electrochromic layers which controllably change color and/or visible transmission upon exposure to solar radiation or application of a voltage; layered protective antilacerative structures on the inboard side of a conventional three layer glass/PVB sheet/glass laminate to minimize lacerations from sharp edges of broken glass; special plastic layers in bilayer structures replacing one glass layer of such a three layer glass laminate, and similar, functional performance-enhancing layers and coatings. These performance layers are usually deposited on or adhered to a carrier layer which is different from the low modulus, elastomeric PVB which is unsuitable as a carrier. For use in safety glazings a carrier layer should have good clarity, be relatively uniform in thickness and strong having high modulus to facilitate ease of handling and processing during association with the performance layer(s). Frequently biaxially oriented polyethylene terephthalate is used as noted, for example, in U.S. Pat. No. 4,465,736.

Using PET in glass laminates offers many advantages. As U.S. Pat. No. 5,024,895, to Kavanagh et al., and U.S. Pat. No. 5,091,258, to Moran, disclose, PET can be biaxially stretched to improve strength and can be heat stabilized to provide low shrinkage characteristics when subjected to elevated temperatures. The tensile modulus, a desired property of glass laminate interlayers and an indication of the stiffness of the interlayer, 21° C.-25° C. of PET is about $10^{10}$ Pa as compared with about $10^7$ Pa for PVB of the type used in safety glazings. This increased stiffness of PET is a desirable property for use in glass laminates.

Many applications of PET involve a layer of PET being used as a carrier for the aforementioned functional layers, such as solar radiation blockers, antennas or heat strips. U.S. Pat. No. 5,979,932, to Jourdaine et al., U.S. Pat. No. 5,091,258, to Moran, and U.S. Pat. No. 5,932,329, to Frost et al., disclose a PET layer between two PVB layers wherein the PET layer is provided with an infrared-reflective coating. U.S. Pat. No. 4,017,661, to Gillery, discloses a composite interlayer wherein a PET sheet is coated with an optically clear, electrically conductive, transparent coating used as a carrier for metal layers which can be electrically heated for defrosting the glass laminate. U.S. Pat. No. 5,024,895, to Kavanagh et al., discloses a PET layer between two PVB layers that includes an integrated infrared-reflective and an electrically conductive coating.

Although most prior art laminates generally provide acceptable resistance to shattering when struck with a blunt object, there is often unacceptable resistance to penetration and pullout. For example, in the case of automobile break-ins, prior art glass laminates often will not shatter, but will break. After being broken, though, the prior art glass laminates usually are significantly weakened and are thus susceptible to being pulled out of their frames. This lack of stiffness in prior art glass laminates can effectively offset the otherwise acceptable shatter-resistant nature of the glass laminates, particularly in automotive break-in situations. Many prior art glass laminates do not exhibit acceptable strength properties after being broken.

Furthermore, although simply increasing the PVB thickness can improve resistance to penetration, this solution does not alleviate the poor resistance to pullout problem. Increased thickness laminates can also be limited by optical clarity. It is of utmost importance that glass laminates used for automotive safety glazings exhibit a high degree of optical clarity; that is, exhibit high level of visible transmission and low levels of optical haze or light scattering. Prior art laminates do not provide a means to achieve a significant increase in laminate stiffness without compromising optical clarity.

It would thus be desirable to develop a glass laminate that exhibited superior penetration resistant qualities, as well as an increased stiffness so as to improve the glass laminate's resistant to pullout after the glass is broken, for example, for use in security glazing applications such as architectural and automotive glazing. Furthermore, it would be desirable to improve the stiffness of a laminate without sacrificing its optical clarity.

SUMMARY OF THE INVENTION

This invention provides a composite laminate interlayer for use in manufacturing intrusion resistant glass laminates having a higher laminate stiffness. Such laminates of the present invention comprise an interlayer having two outside layers of PVB, and two inside layers of bonded optical grade PET. To increase the stiffness in the laminate, it has been found that using two pieces of optical grade PET improves the stiffness of the laminate but does not significantly reduce the optical clarity of the laminate. This contrasts common practice which recognizes that as the thickness of a single layer of PET increases, its optical clarity is reduced. Optical grade PET with haze levels less than ~1.0% is limited to about 0.175 mm (7 mil) or less. Combining two pieces of optical grade PET, for example two 7-mil pieces, improves the laminate's resistance to breaking and pullout/push-in as a single layer of PET of the same combined thickness would, without significantly sacrificing the optical clarity of the laminate.

Another aspect of this invention provides a composite laminate interlayer comprising two layers of PET between layers of plasticized PVB adhesive where at least one of the PVB layers exhibits enhanced stiffness. In one aspect of the invention, high stiffness in plasticized PVB is provided by reducing the level of plasticizer in the PVB. This is indicated by a rise in glass transition temperature (Tg) of the plasticized PVB, e.g. about 2 to 3° C. above typical values for a commercial application. For instance, for automotive applications, where plasticized PVB sheet typically has a Tg of about 30-33° C., high stiffness PVB of this invention will have a Tg of at least 35° C.

Another aspect of this invention provides interlayer composites with other functional layers, e.g. sound dampening elastomer layers or radiation blocking layers.

DETAILED DESCRIPTION OF PREFERRED EMBODIMENTS

As used herein glass transition temperature (Tg) of plasticized PVB is determined by rheometric dynamic analysis using the following procedure. Plasticized PVB sheet is molded into a sample disc of 25 millimeters (mm) in diameter. The PVB sample disc is placed between two 25-mm diameter parallel plate test fixtures of a Rheometrics Dynamic Spectrometer II. The PVB sample disc is tested in shear mode at an oscillation frequency of 1 Hertz as the temperature of the PVB sample is increased from −20 to 70° C. at a rate of 2° C./minute. Experience indicates that the method is reproducible to within ±1° C. Commercially used PVB typically has a Tg in the range of 30-33 ° C.

Visual haze for both the PET film components and the glass laminate are measured according to ASTM D1003 using Illuminant C and an observer angle of 2°.

As used herein, the units of "mils", "mm" and "inch" will be used in describing the thickness of a glass laminate interlayer. The relationship of these units is illustrated as such: 0.25 mm is roughly equivalent to 10 mils and 0.01 inch.

The preferred embodiment of the present invention is a glass laminate in which two bonded PET sheets are placed between two standard sheets of PVB. It has been found that increasing the thickness of the PET layer greatly enhances the stiffness of the glass laminate, thus improving the strength of the glass laminate after breaking. Optical quality of PET film, particularly visual haze, though, is a problem above thicknesses of about 7 mil, whereas PET of about 7 mil or less exhibits acceptable haze of 1% or less. For example, typical haze levels for 10 mil Mylar film produced by E.I. du Pont de Nemours is 2% and above that thickness the haze levels are much higher. The high haze of the PET layers greater than about 7 mil prohibits the use of these thick layers in combination with PVB for use as automotive glazings, where optical clarity is essential.

A key advantage of the present invention involves the inherent nature of layers of PET over 10 mils having unacceptable haze characteristics. It has been found that using two layers of PET with acceptable haze characteristics (less than about 1% haze) in combination have the desired and required optical clarity for use in glass laminates. Thus, for instance, providing two 7 mil layers of PET for a total PET layer thickness of 14 mil gives the laminate improved stiffness qualities, without significantly diminishing the optical clarity of the laminate. Providing two layers of PET with acceptable optical clarity between two layers of PVB provides many advantages, including a laminate with increased stiffness (when compared to a conventional laminate) without sacrificing the optical clarity of the laminate.

In the preferred embodiment, two optical grade PET sheets are used in place of a thicker PET sheet. The most preferred embodiment employs two PET sheets of about 7-mil thickness each bonded together between two PVB layers. The application of the PET in this manner significantly reduces the haze problem otherwise associated when a single, 14 mil thick PET layer is used.

Preferably, the two PET layers are bonded with an adhesive. A layer of plasticized PVB, polyurethane 2-component reactive cure, pressure sensitive acrylic resins, and other known adhesives can all be used so long as the chosen adhesive does not substantially increase the haze of glass laminate of this invention. The chosen adhesive used with the composite interlayer of the present invention preferably should not substantially differ in sound attenuating performance from that of a laminated glass made with standard PVB. Laminated glass having high sound attenuation will most likely have decreased intrusion resistance, which is not a desired property of the present invention.

One preferred adhesive is a pressure sensitive acrylic resin. This class of adhesives exhibits the preferred clarity that is a desired component of this invention. The acrylic resin preferably comprises polyacrylate esters of varying molecular weights and ester functionalities. The acrylic resin may also contain functional monomers which are used to provide a means for crosslinking of polymer molecules to increase the creep resistance or shear strength. The most preferred adhesive is commercially available from Solutia, Inc. as Gelva multi-polymer solution adhesive (GMS 263).

PVB resin is produced by known aqueous or solvent acetalization processes reacting PVOH with butyraldehyde in the presence of acid catalyst, followed by neutralization of the catalyst, separation, stabilization and drying of the resin. It is commercially available from Solutia, Inc. as Butvar ® resin. PVB resin typically has a weight average molecular weight greater than 70,000, preferably about 100,000 to 250,000, as measured by size exclusion chromatography using low angle laser light scattering. On a weight basis PVB typically comprises less than 22%, preferably about 17 to 19% hydroxyl groups calculated as polyvinyl alcohol (PVOH); up to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954.

The PVB resin of the sheet is typically plasticized with about 20 to 80 and more commonly 25 to 45 parts plasticizer per hundred parts of resin. Plasticizers commonly employed are esters of a polybasic acid or a polyhydric alcohol. Suitable plasticizers are triethylene glycol di-(2-ethylbutyrate), triethyleneglycol di-(2-ethylhexanoate), tetraethyleneglycol diheptanoate, dihexyl adipate, dioctyl adipate, mixtures of heptyl and nonyl adipates, dibutyl sebacate, polymeric plasticizers such as the oil-modified sebacic alkyds, and mixtures of phosphates and adipates such as disclosed in U.S. Pat. No. 3,841,890 and adipates and alkyl benzyl phthalates as disclosed in U.S. Pat. No. 4,144,217. Also mixed adipates made from $C_4$ to $C_9$ alkyl alcohols and cyclo $C_4$ to $C_{10}$ alcohols as disclosed in U.S. Pat. No. 5,013,779. $C_6$ to $C_8$ adipate esters such as hexyl adipate are preferred plasticizers. A more preferred plasticizer is triethylene glycol di-(2-ethylhexanoate).

In an alternative embodiment, the amount of plasticizer used is a convenient means to modifying and controlling the stiffness of the PVB. A useful surrogate property for stiffness is Tg which is directly related to the level of plasticizer. The plasticized PVB sheet used in the laminates of the preferred embodiment, though, have normal Tg values of about 33° C. or less. Some embodiments of this invention can have a Tg of at least 35° C. or higher by modifying the plasticizer content of the PVB.

As disclosed in U.S. Pat. No. 5,618,863 it is also often useful or desirable to incorporate a UV absorber in PVB. In addition to plasticizer, optional UV absorber and adhesion control agent, PVB sheet may contain other performance-enhancing additives such as pigments or dyes for coloring all or part of the sheet, antioxidants and the like. PVB sheet is prepared by mixing combined plasticizer and other additives (e.g. UV-absorber, adhesion control agent and the like) with PVB resin and forcing the mixture under pressure through a die opening to form a sheet. Thickness of the PVB sheet can range from about 0.1 to 2 mm (about 4-80 mil) thick, typically about 0.375 to about 1.5 mm (about 15-60 mils) thick to provide the desired performance in the glass laminate.

The PET sheets for use in the composite interlayer of this invention are preferably biaxially stretched to improve strength and been heat stabilized to provide low shrinkage characteristics when subjected to elevated temperatures (i.e. less than 2% shrinkage in both directions after 30 min. exposure at 150° C.). The tensile modulus (at 21-25° C.) of polyethylene terephthalate is about $10^{10}$ Pa as compared with about $10^7$ Pa for a plasticized polyvinyl butyral of the type used in safety glazings. To facilitate bonding of PVB to PET, any known coating and/or surface treatment may be applied to the PET. Preferably, plasma treatment of biaxially stretched polyester to improve adhesion as disclosed in European Patent 157030 B1, and U.S. Pat. No. 4,732,814, incorporated herein by reference, is used. Another method for treating the surface of PET film includes deposition of a thin layer of carbon by vacuum sputtering as disclosed by Kittler in U.S. Pat. No. 4,865,711 (incorporated herein by reference).

Composite interlayers according to this invention are prepared by known procedures. See for instance, U.S. Pat. Nos. 4,973,511, 5,024,895 and 5,091,258 (incorporated herein by reference) for methods for laminating plasticized PVB to surface-treated PET sheet. Because final bonding conditions will be experienced when the interlayer is bonded to glass, the degree of bonding of PVB to PET in the composite interlayer is not critical. If a layer of plasticized PVB in the composite interlayers of this invention has a Tg higher than convention, a person of ordinary skill in the art will appreciate a need to raise the processing temperature of the PVB sheet by an amount corresponding to the elevation in Tg. Suitable temperatures for bonding PVB to PET will typically be in the range of 50 to 120° C. The PET/PVB composites can be pressed, e.g. in a nip roller, to improve adhesion.

Glass laminates using sheets of the invention are prepared by known procedures, e.g. as disclosed in U.S. Pat. Nos. 5,024,895; 5,091,258; 5,145,744; 5,189,551; 5,264,058 and 5,529,654 (all of which are incorporated herein by reference). In one conventional method, the composite interlayer is placed between two sheets of glass and heated under vacuum to a temperature in the range of about 85 to 120° C. for about 10 to 30 minutes, depending on temperature, to remove air from between the layers of the laminate and to seal the laminate edge prior to autoclave lamination. After de-airing and edge sealing are completed, the laminate is preferably heated in an autoclave at elevated temperature (about 90 to 165° C.) and pressure (about 1000 to 2000 kPa) for sufficient time to firmly bond the layers of the laminate. Non-autoclave methods as disclosed in U.S. Pat. No. 5,536,347 may are also useful, e.g. for plasticized PVB having only moderate increases in Tg.

A typical glass laminate of the current invention contains glass sheets that are usually float glass, heat strengthened glass or tempered glass typically in the range of 1 to 10 millimeters (mm) thick, preferably in the range of 1-5 mm thick. Between and bonded to the glass sheets is a composite interlayer comprising two PET sheets between layers of plasticized PVB adhesive. Each PVB sheet is preferably about 0.76 mm thick, and each PET sheet is biaxially-oriented and can be in the range of about 0.025 to 0.25 mm thick (1 to 10 mils), preferably about 0.175 mm thick (7 mils) thick, for a total preferred PET thickness of 0.350 mm (14 mils). The optical clarity of each PET layer must exhibit acceptable optical clarity characteristics, preferably below 1% haze. The PET layers are bonded together, preferably with a pressure sensitive acrylic resin.

For desired adhesion to the PVB, the surface of the PET is preferably modified, such as by roughening of the surface or by chemical modification of the material at the surface. Such modification can be effected by flame treatment, chemical oxidation, corona discharge, carbon sputtering, plasma treatment in vacuum or in air or other treatments well known to those of ordinary skill in the art.

The PVB is plasticized, most preferably with triethylene glycol di-(2-ethylhexanoate). The plasticizer can be added, alternatively, in an amount to provide a Tg of at least 35° C. In the laminates of this invention, the PVB layers can be similar, e.g. both PVB layers having a Tg of at least 35° C. or, having a conventional Tg value, with the preferred embodiment encompassing similar layers of conventional PVB. Alternatively, the two layers can be different, e.g. one plasticized PVB layer having a conventional Tg of about 30 to 33° C. and the other PVB layer being stiffened by having a Tg of at least 35° C.

A further embodiment of the present invention is a glass laminate containing an additional functional layer. This layer can be, e.g., a sound attenuating elastomer layer as disclosed in U.S. Pat. No. 5,796,055 (incorporated herein by reference) or a radiation blocking layer, e.g. comprising a composite of one or more layers of metal or metal oxide deposited onto either PET layer as disclosed in any of U.S. Pat. Nos. 5,024,895, 5,091,258 or 5,932,329 (the disclosures of all four patents being incorporated herein by reference). If a sound attenuating layer is used, it should be added to the glass laminate of the present invention by replacing one of the two PVB layers.

An alternative embodiment to the present invention is the use of multiple layers of optical grade PET, limited only by the haze characteristics of the final glass laminate. For instance, using two 5-mil sheets and one 2-mil sheet of optical grade PET could be used to improve the stiffness of the glass laminate without reducing its optical clarity. It is within the scope of this invention to use multiple thinner, optical grade PET sheets in place of an equivalent thicker sheet of PET, the total number of sheets used being limited only to having an acceptable optical clarity.

The following Examples illustrate and do not limit or restrict the invention and are illustrated using the following materials.

EXAMPLE 1

Haze Measurements

A series of glass laminates were made to assess the effects of the inclusion of various PET films on the optical haze. These glass laminate structures were prepared using conventional PVB laminating techniques in combination with two pieces of 2.3-mm thickness clear annealed float glass and various combinations of PET and PVB as described in the table below. The 14 mil (0.35 mm) PET component was a composite of two layers of 7 mil (0.18 mm) films bonded together with the Gelva 263 acrylic pressure sensitive adhesive. Haze measurements were made in accordance with ASTM D1003 using Illuminant C (2° observer angle), the results of which are disclosed in TABLE 1.

TABLE 1

Haze Measurements of Glass Laminates of Varying PET Thicknesses

| Laminate Description | Haze (%) |
|---|---|
| #1 0.76 mm PVB (standard laminate) | 0.50 |
| #2 0.76 mm PVB/0.18 mm PET/0.76 mm PVB | 1.0 |
| #3 0.76 mm PVB/0.35 mm PET/0.76 mm PVB | 1.3 |

While an increased haze level was observed for laminate #3 as compared to the standard laminate, the observed haze for laminate #3 is significantly less than what would be observed for a laminate containing a single layer of PET of comparable thickness.

EXAMPLE 2

Standard Laminate

A standard glass laminate was prepared for use as a control during the experiments. This control was a sandwich of two pieces of heat-strengthened float glass with a homogeneous interlayer of conventional PVB having a Tg of about 33° C. Each layer of glass typically measured 2.1 mm thick, while the PVB layer was 0.76 mm. The standard laminate performed acceptably in blunt-pendulum impact testing, with tests indicating that the standard laminate required 20-30 sec to penetrate, as opposed to less than 2 sec for tempered glass. Formal blunt-pendulum tests were conducted according to the British Standards Institute (BS) AU 209, part 4a, which is a pendulum test that uses a 9.5 kg blunt pendulum to inflict 65 joules (J) of impact energy on the target glass laminate. Furthermore, pendulum impact and headform pullout/push in tests were performed, in which a pendulum test was first performed followed by the pullout/push in tests.

The target of these tests was a front side door, with glass edge engagement of at least 14 mm. At the 65 J impact level, the standard laminate showed a considerable deformation (~3 cm), suggesting that the standard laminate was on the edge of its ability to pass this test.

With there being increasing awareness for the need for tougher, stronger glass laminates, a modification of the BS AU 209, part 4a test was done in which a 19.5 kg pendulum replaced the 9.5 kg pendulum, delivering 134 J of impact energy onto the glass laminate. This resulted in failure, i.e. penetration by the pendulum or separation between the metal frame and the glazing, for all standard laminate test samples. Thus, it is desirable to develop an improved stiffness glass laminate, resulting in a product that can withstand the increased forces that are common to criminal attacks.

EXAMPLE 3

Improved Laminates Used in Testing

Based on the results of the modified, heavy-pendulum testing described in Example 2, modifications were made to the laminates to improve both penetration resistance and stiffness. In light of this, the following laminates were used for further testing:

TABLE 2

Test Laminates for Intrusion Resistant Trials

| Laminate | PVB (mm) | PVB-A (mm) | PET (mm) | PVB-A (mm) | PVB (mm) |
|---|---|---|---|---|---|
| A | 0.76 | — | 0.18 | — | 0.76 |
| B | — | 0.76 | 0.18 | 0.76 | — |
| C | 0.76 | — | 0.35 | — | 0.76 |
| D (Standard) | 1.52 | — | — | — | — |

The PVB used in laminates A, C and D was industry standard automotive grade Saflex® PVB made by Solutia Inc. containing normal plasticizer levels. The PVB used in laminate B (PVB-A) was an experimental material with increased stiffness, wherein the plasticizer level was adjusted so as to give a PVB layer with a Tg greater than 35° C. The PET layers used in laminates A and B comprised a single sheet of optical grade 7 mil (0.18 mm) thickness PET film. The PET layer used in laminate C comprised two sheets of optical grade 7 mil (0.18 mm) thickness PET film bonded together with acrylic adhesive. Testing of these trial laminates followed the parameters of BS AU 209, part 4a. Flat annealed glass 2.3 mm thick was used for fabrication of the laminates. A generic door was fitted with a 45×60-cm opening, with the laminate fully secured in the testing frame having a glass-edge engagement of at least 10-mm. The following testing protocols shown in Table 3 were used to examine the major weaknesses of the laminates in real-world type attacks of various tools, and employed the energy levels of the same order of magnitude as is known in criminal attacks.

TABLE 3

Test Types and Data Recorded

| Test | Test Element | Description |
|---|---|---|
| 1 | Pendulum impact testing | Std. (65 J) + modified (134 J) BS AU 209 4a test procedure was used. Deformation was recorded. number of impacts until penetration was recorded |

TABLE 3-continued

Test Types and Data Recorded

| Test | Test Element | Description |
|---|---|---|
| 2 | Axehead impact testing | Modified BS AU 209 4a test procedure using axehead strike tool. Deformation was recorded; number of impacts until penetration was recorded. |
| 3 | Headform pull-out/push-in resistance | Performed after pendulum impact; load vs. deformation were recorded. |
| 4 | Blunt head impact then headform pull out/push in | Multiple strike/same location blunt head impact. Load vs. deformation were recorded after penetration. |
| 5 | Axehead impact then headform pull out/ push in | Multiple strike/same location axehead impact. Load vs. deformation performed after axehead penetrated laminate; load vs. deformation were recorded. |

EXAMPLE 4

Pendulum Impact Test (Test #1)

The pendulum mass used was either 9.5 kg, delivering an impact energy of 65 J, or at 19.5 kg, delivering an impact energy of 134 J. All impacts were made at the center of the laminates instead of toward the top center as specified by BS AU 209, part 4a, and were in a diamond shaped pattern, as in the standard method.

Results of the pendulum impact test are summarized in TABLE 4. Because the laminate was fully secured in the testing frame, the standard laminate passed the pendulum impact test at the higher impact energy (134 J). However, the severe deformation of the laminate indicates that in real-world situations, it would most likely result in window failure, either through collapse (folding), or pullout. Laminates A-C all showed substantial improvements in resistance to the blunt-head impact, with significantly less severity of laminate deformation. As shown in TABLE 4, laminates B and C, the preferred embodiment of the present invention, exhibited the best resistance to the blunt-head impact.

TABLE 4

Results of Pendulum Testing

| Laminate Type | Impact Energy (J) | Pass/Fail BS AU 209 | Laminate Integrity |
|---|---|---|---|
| Standard | 65 | Pass | 3-cm deformation |
| Standard | 134 | Pass | 4-cm deformation |
| A | 65 | Pass | <1.0-cm deformation |
| A | 134 | Pass | <1.5-cm deformation |
| B | 65 | Pass | <0.5-cm deformation |
| B | 134 | Pass | <1.0-cm deformation |
| C | 65 | Pass | <0.5-cm deformation |
| C | 134 | Pass | <1.0-cm deformation |

EXAMPLE 5

Axehead Impact Testing (Test #2)

An axehead impact was performed on a BS AU 209 apparatus at an impact energy level of 65 J. The laminate was continuously impacted with the axehead at the same strike position until penetration occurred. A 9-cm long slit was created on the laminate after the axehead penetration.

Test results are summarized in TABLE 5. While standard laminate delivers reasonably good resistance to axehead impact, the PVB composite laminates, particularly the preferred embodiment of the present invention laminate C, revealed exceptionally high resistance to the attack of the cutting tool. The stiffness data from TABLE 5 is discussed in Example 8 below.

TABLE 5

Results of Axehead Impact

| Laminate Type | Number of Impacts to Fail | Apparent Laminate Stiffness | Maximum Laminate Stiffness |
|---|---|---|---|
| Standard | 3 | 70 | 120 |
| A | 4 | 315 | 545 |
| B | 7 | 680 | 900 |
| C | 16 | 450 | 760 |

EXAMPLE 6

Headform Pullout/Push-In Resistance (Test #3)

Prior to headform pullout/push-in testing, each laminate was impacted per the modified BS AU 209, part 4a test at an energy level of 65 J (using the 9.5 kg pendulum). Headform pullout/push-in resistance was done with a ram having an 18-cm diameter, hemispherical metal head. Pullout/push-in speed was 10 cm/min perpendicular to the impacted side of the laminate. Force (load) applied to the laminate vs. the displacement (distance the laminate was pushed in) was recorded. The apparent laminate modulus was obtained by dividing the maximum load by the maximum displacement. Maximum laminate modulus was the highest average of the slopes from the pullout force vs. displacement curve over a range of 2-cm displacement. Results are summarized in TABLE 6.

As shown, laminates B and C showed much improved modulus properties over the standard laminate and laminate A. This increased resistance to headform pullout/push-in testing represents improved strength of the laminates after being broken with a blunt object. This increased laminate modulus or stiffness after glass breakage is a very desirable property in automotive laminates as a deterrent to break-ins.

TABLE 6

Results of Headform Pullout/Push-In Resistance Testing

| Interlayer Type | Apparent Laminate Modulus (N/cm displacement) | Maximum Laminate Modulus (N/cm displacement) |
|---|---|---|
| Standard | 150 | 230 |
| A | 440 | 690 |
| B | 800 | 1100 |
| C | 695 | 1000 |

EXAMPLE 7

Blunt-Head Impact & Headform Pullout/Push-In Sequence (Test #4)

In real world attacks, the thief could smash a 3 to 4 cm diameter hole through the laminate, insert a hook through the hole, and pull outward. A blunt-head impact headform pullout/push-in testing sequence was first used to examine how well the laminates resist such attacks. All laminates were subjected to continuous impacts at 134 J of impact energy (using the 19.5 kg pendulum) at the same position until blunt head penetration occurred. After the penetration, the laminates were tested for pullout/push-in resistance. The results are summarized in TABLE 7.

TABLE 7

Results of Blunt-Head Impact & Headform Pullout/Push-in Sequence

| Interlayer Type | Number of Impacts to Fail | Apparent Laminate Stiffness | Maximum Laminate Stiffness |
|---|---|---|---|
| Standard | 3 | 70 | 110 |
| A | 7 | 295 | 510 |
| B | 12 | 600 | 875 |
| C | 9 | 395 | 770 |

The standard laminate loses half of the stiffness after the penetration and is, thus, vulnerable to this type of testing sequence. The laminates B and C showed greater resistance to the blunt-head impact at higher energy level, and they had the highest measured stiffness after the penetration. It would take tremendous effort to pull these laminates out of the window frame, even though a 3 to 4 cm diameter hole has been made in each laminate.

EXAMPLE 8

Axehead Impact & Headform Pullout/Push-In Sequence (Test #5)

The axehead impact—headform pullout/push-in test sequence was carried out in a matter similar to that of Example 7, except that 65 J of impact energy was used (using the 9.5 kg pendulum). Similar results were obtained as in Example 7, and the results are summarized in TABLE 5. Laminates B and C showed the greatest resistance to the axehead impact, and they had the highest measured stiffness after the penetration. It would take tremendous effort to pull these laminates out of the window frame, even though a 9 cm slit has been made in each laminate.

The preceding description is set forth for purposes of illustration only and is not to be taken in a limited sense. Various modifications and alterations will be readily apparent to persons skilled in the art. It is intended, therefore, that the foregoing be considered as exemplary only and that the scope of the invention be ascertained from the following claims.

I claim:

1. A composite laminate interlayer for a glass laminate, comprising:
    two sheets of biaxially stretched polyethylene terephthalate bonded together with adhesive between two layers of plasticized polyvinyl butyral;
    wherein the thickness of each biaxially stretched polyethylene terephthalate sheet is between 0.025 mm and 0.175 mm and the thickness of each plasticized polyvinyl butyral layer is between 0.1 mm and 2 mm; and
    wherein the composite interlayer has less optical haze than a composite interlayer formed from a single sheet of polyethylene terephthalate having the same thickness as the two sheets of bonded biaxially stretched polyethylene terephthalate in combination.

2. The interlayer of claim 1, wherein each biaxially stretched polyethylene terephthalate sheet has a different thickness.

3. The interlayer of claim 1, wherein each biaxially stretched polyethylene terephthalate sheet has the same thickness.

4. The interlayer of claim 1, wherein the thickness of each biaxially stretched polyethylene terephthalate sheet is about 0.175 mm.

5. The interlayer of claim 4, wherein the thickness of said two sheets of biaxially stretched polyethylene terephthalate bonded together with adhesive is about 0.350 mm.

6. The interlayer of claim 1, wherein the thickness of each plasticized polyvinyl butyral layer is 0.375 mm to 1.5 mm.

7. The interlayer of claim 1, wherein each of said two sheets of biaxially stretched polyethylene terephthalate has a haze of less than 1%.

8. The interlayer of claim 1, wherein said sheets of biaxially stretched polyethylene terephthalate are bonded with a pressure sensitive acrylic resin.

9. The interlayer of claim 1, wherein one of said layers of plasticized polyvinyl butyral has a glass transition temperature of at least 35° C.

10. A glass laminate, comprising, in order:
    a first pane of glass;
    a first polyvinyl butyral layer;
    two sheets of biaxially stretched polyethylene terephthalate bonded together with adhesive;
    a second polyvinyl butyral layer; and, a second pane of glass;
    wherein the thickness of each biaxially stretched polyethylene terephthalate sheet is between 0.025 mm and 0.175 mm and the thickness of each plasticized polyvinyl butyral layer is between 0.1 mm and 2 mm; and
    wherein the composite interlayer has less optical haze than a composite interlayer formed from a single sheet of polyethylene terephthalate having the same thickness as the two sheets of bonded biaxially stretched polyethylene terephthalate in combination.

11. The laminate of claim 10, wherein each biaxially stretched polyethylene terephthalate sheet has a different thickness.

12. The laminate of claim 10, wherein each biaxially stretched polyethylene terephthalate sheet has the same thickness.

13. The laminate of claim 10, wherein the thickness of each biaxially stretched polyethylene terephthalate sheet is about 0.175 mm.

14. The laminate of claim 13, wherein the thickness of said two sheets of biaxially stretched polyethylene terephthalate bonded together with adhesive is about 0.350 mm.

15. The laminate of claim 10, wherein the thickness of each plasticized polyvinyl butyral layer is 0.375 mm to 1.5 mm.

16. The laminate of claim 10, wherein each of said two sheets of biaxially stretched polyethylene terephthalate has a haze of less than 1%.

17. The laminate of claim 10, wherein said sheets of biaxially stretched polyethylene terephthalate are bonded with a pressure sensitive acrylic resin.

18. The laminate of claim 10, wherein one of said layers of plasticized polyvinyl butyral has a glass transition temperature of at least 35° C.

19. A composite laminate interlayer for a glass laminate, comprising two sheets of biaxially stretched polyethylene terephthalate bonded together with pressure sensitive acrylic resin between two layers of plasticized polyvinyl butyral;

wherein the thickness of each biaxially stretched polyethylene terephthalate sheet is between 0.025 mm and 0.25 mm, the thickness of each plasticized polyvinyl butyral layer is about 0.76 mm, the total thickness of the two sheets of biaxially stretched polyethylene terephthalate bonded together with pressure sensitive acrylic resin is 0.350 mm; and wherein the composite interlayer has less optical haze than a composite interlayer formed from a single sheet of polyethylene terephthalate having the same thickness as the two sheets of bonded biaxially stretched polyethylene terephthalate in combination.

* * * * *